United States Patent
Breen et al.

(10) Patent No.: US 6,258,336 B1
(45) Date of Patent: Jul. 10, 2001

(54) METHOD AND APPARATUS FOR NO$_x$ REDUCTION IN FLUE GASES

(75) Inventors: Bernard P. Breen, Pittsburgh, PA (US); Harjit S. Hura, Cincinnati, OH (US)

(73) Assignee: Gas Research Institute, Chicago, IL (US)

(*) Notice: Subject to any disclaimer, the term of this patent is extended or adjusted under 35 U.S.C. 154(b) by 0 days.

(21) Appl. No.: 09/276,910

(22) Filed: Mar. 26, 1999

Related U.S. Application Data

(63) Continuation-in-part of application No. 08/880,274, filed on Jun. 23, 1997, now abandoned, which is a continuation-in-part of application No. 08/848,104, filed on Apr. 28, 1997, now abandoned, which is a continuation of application No. 08/489,213, filed on Jun. 9, 1995, now abandoned.

(51) Int. Cl.$^7$ .................................................. C01B 21/20
(52) U.S. Cl. ...................... 423/239.1; 110/203; 110/210; 110/212; 423/235
(58) Field of Search ................................. 423/235, 239.1; 110/203, 210, 212, 213; 422/172, 182; 431/8, 9, 181, 187, 188

(56) References Cited

U.S. PATENT DOCUMENTS

| | | |
|---|---|---|
| 4,325,924 | 4/1982 | Arand et al. . |
| 4,335,084 | 6/1982 | Brogan . |
| 4,719,092 | 1/1988 | Bowers .................................. 423/235 |
| 4,770,863 | 9/1988 | Epperly etal. ......................... 423/235 |
| 4,779,545 | 10/1988 | Breen et al. . |
| 4,851,201 | 7/1989 | Heap et al. . |
| 4,861,567 | 8/1989 | Heap et al. ............................ 423/235 |
| 4,960,059 | 10/1990 | Berkau et al. . |
| 5,078,064 | 1/1992 | Breen et al. . |
| 5,139,755 | 8/1992 | Seeker et al. . |
| 5,141,726 | 8/1992 | Breen et al. . |
| 5,181,475 | 1/1993 | Breen et al. . |
| 5,190,451 | 3/1993 | Goldback . |
| 5,252,298 | 10/1993 | Jones . |
| 5,309,850 | 5/1994 | Downs et al. . |
| 5,333,558 | 8/1994 | Lees, Jr. . |
| 5,339,774 | 8/1994 | Tang . |
| 5,402,439 | 3/1995 | Bullmann et al. . |
| 5,443,805 | 8/1995 | Beer et al. . |
| 5,478,542 | 12/1995 | Chawla et al. . |
| 5,655,899 | 8/1997 | Hura et al. . |
| 5,756,059 | 5/1998 | Zamansky et al. ............... 423/239.1 |

OTHER PUBLICATIONS

Stephen C. Wood: Select the Right No$_x$ Control Technology, *Chemical Engineering Progress*, 32–38, Jan. 1994.

James A. Mulholland et al.: *Reburning Application to Firetube Package Boilers*, EPA Contract No. 68–02–3648, Task No. 49, EPA–600/7–87–011, Mar. 1987.

(List continued on next page.)

*Primary Examiner*—Steven P. Griffin
(74) *Attorney, Agent, or Firm*—Pauley Petersen Kinne & Fejer

(57) ABSTRACT

In a furnace having a primary combustion zone for combustion of a fuel and oxidant, an in-furnace method for reducing nitrogen oxides in combustion products generated in the primary combustion zone in which at least one fluid fuel selected from the group consisting of natural gas, hydrogen, $C_xH_y$ compounds, $C_xH_yO_z$ compounds and mixtures thereof in an amount in a range of about 2.0% to about 25% of a total heat input to the furnace and at least one nitrogenous compound selected from the group consisting of ammonia, amines, urea, cyanuric acid and mixtures thereof are injected into the furnace downstream of the primary combustion zone, forming an overall fuel-lean NO$_x$-reduction zone.

37 Claims, 4 Drawing Sheets

OTHER PUBLICATIONS

*Enhancing the Use of Coals by Gas Reburning—Sorbent Injection*, Energy and Environmental Research Corporation (EER), First Industry Panel Meeting, Pittsburgh, PA, Mar. 15, 1988.

*GR–SI Process Design Studies for Hennepin Unit #1—Project Review*, Energy and Environmental Research Corporation (EER), submitted at the Project Review Meeting on Jun. 15–16, 1988.

Wendt, et al.: *Reduction of Sulfur Trioxide and Nitrogen Oxides by Secondary Fuel Injection*, Symposium of the Combustion Institute, 1972.

Sakai et al.: *Mitsubishi "MACT" In–Furnace NOx Removal Process for Steam Generator*, presented at the U.S. Japan NOx Information Exchange, Tokyo, Japan, May 25–30, 1981.

Mulholland et al.: Application of Reburning for NOx Control to a Firetube Package Boiler, *Journal of Engineering for Gas Turbines and Power*, vol. 107, 739–743, Jul. 1985.

Danish Gas Technology Centre: *Gas Reburning and Gas Injection in Combination with SNCR in a Waste Incineration Plant*, International Gas Reburn Technology Workshop, Feb. 7–9, 1995.

E.C. Moller, et al.: Optimization of Natural Gas Reburning for Controlling Pollutant Emissions from Oil Fried Boilers, 1988 Spring Meeting, *Western State Section/The Combustion Institute*, Salt Lake City, Utah, Mar. 21–22, 1988.

Blair Folsom et al.: Advanced Reburning With New Process Enhancements, EPRI/EPA Joint Symposium on Stationary Combustion NOx Control, *Electric Power Research Institute*, Book 4, Sessions 8A and 8B, May 19, 1995.

S.L. Chen, et al.: Advanced NOx Reduction Processes Using –NH and –CN Compounds in Conjunction With Staged Air Addition, Twenty–Second Symposium (International) on Combustion, *The Combustion Institute*, 1135–1145, 1988.

Vladimir M. Zamansky, et al.: Reburning Promoted by Nitrogen– and Sodium–Containing Compounds, Energy and Environmental Research Corporation, 26th International Symposium on Combustion, Naples, Italy, Jul. 28–Aug. 2, 1996.

Vladimir M. Zamansky, et al.: Second Generation Advanced Reburning, Energy and Environmental Research Corporation, PETC Contractors Conference, Jul. 7–10,1996.

Vladimir M. Zamansky, et al.: Second Generation Advanced Reburning For High Efficiency $NO_x$ Control, Energy and Environmental Research Corporation, 1996 American Flame Research Committee International Symposium, Baltimore, Maryland, Sep. 30–Oct. 2,1996.

METHOD AND APPARATUS FOR $NO_x$ REDUCTION IN FLUE GASES

CROSS REFERENCE TO RELATED APPLICATION

This application is a continuation-in-part application of U.S. patent application Ser. No. 08/880,274 filed Jun. 23, 1997, now abandoned, which is a continuation-in-part of Ser. No. 08/848,104, filed Apr. 28, 1997, now abandoned, which is a continuation of Ser. No. 08/489,213, filed Jun. 09, 1995, now abandoned.

BACKGROUND OF THE INVENTION

1. Field of the Invention

This invention relates to a method and apparatus for reduction of nitrogen oxide emissions by industrial heating furnaces, such as utility boilers, fired by carbonaceous fuels, in particular, fuels with fixed nitrogen, such as coal.

2. Description of Prior Art

During the combustion of fuels having fixed nitrogen, such as coal, oxygen from the air combines with the nitrogen to produce nitrogen oxide (NO). At sufficiently high temperatures, oxygen also reacts directly with atmospheric nitrogen to form nitrogen oxide. A small fraction of the nitrogen oxide formed in the flame is oxidized to nitrogen dioxide ($NO_2$) downstream of the flame. The total emission of nitrogen oxides, $NO+NO_2$, is denoted by $NO_x$. The generation and emission of nitrogen oxides are undesirable because they are toxic. In addition, nitrogen oxides, along with oxides of sulfur ($SO_2$, $SO_3$) contribute to acid rain precipitation, and in the presence of sunlight, react with hydrocarbons to produce photochemical smog and ozone.

The 1990 Clean Air Act amendments require industrial furnace operators to reduce nitrogen oxide emissions from fossil fuel-fired furnaces under Title IV of the Act. In addition, measures for ozone attainment under Title I of the 1990 Clean Air Act amendments are also being established. Because nitrogen oxides contribute to tropospheric ozone formation, limitations on $NO_x$ emissions are more stringent during the summer "ozone season." Consequently, many industrial furnace operators that have installed low $NO_x$ burner/overfire air systems or post-combustion control systems will require additional $NO_x$ controls, particularly during the summer months. Thus, there is a need for methods and apparatuses which reduce the nitrogen oxide emissions from such industrial furnace facilities.

Commercially available techniques for reducing nitrogen oxide emissions in furnace flue gases include low-$NO_x$ burners, overfire air, selective non-catalytic $NO_x$ reduction (SNCR), selective catalytic reduction (SNCR), and reburning.

Reburning, that is, in-furnace nitrogen oxide reduction or fuel staging, has been described in several patents and publications. See for example, "Enhancing the Use of Coals by Gas Reburning Sorbent Injection," presented at the Energy and Environmental Research Corporation (EER), First Industry Panel Meeting, Pittsburgh, Pa., Mar. 15, 1988; "GR-SI Process Design Studies for Hennepin Unit No. 1-Project Review," Energy and Environmental Research Corporation (EER), presented at the Project Review Meeting on Jun. 15–16, 1988; "Reduction of Sulfur Trioxide and Nitrogen Oxides By Secondary Fuel Injection," Wendt, et al., published at the Symposium of the Combustion Institute, 1972; "Mitsubishi" MACT In-Furnace $NO_x$ Removal Process For Steam Generator," Sakai et al., published at the U.S.-Japan $NO_x$ Information Exchange, Tokyo, Japan, May 25–30, 1981.

Reburning is a technique whereby a fraction of the total thermal input to the furnace is injected above the primary combustion zone to create a fuel rich zone. Hydrocarbon fuels such as coal, oil, or gas are more effective $NO_x$ reducers than non-carbon containing fuels such as hydrogen or non-hydrogen containing fuels such as carbon monoxide. Stoichiometry of about 0.90 (10% excess fuel) in the reburn zone is considered optimum for $NO_x$ control. Thus, it is apparent that the amount of reburn fuel required for effective $NO_x$ control is directly related to the stoichiometry of the primary combustion zone and, in particular, the amount of excess air therein. Under typical furnace conditions, a reburn fuel input of over 10% of the total fuel input to the furnace is usually sufficient to form a fuel-rich reburn zone. The reburn fuel is injected at high temperatures in order to promote reactions under the overall fuel-rich stoichiometry. Typical flue gas temperatures at the injection point are above 2600° F. Overfire air is introduced into the flue gases downstream of the fuel-rich reburn zone in order to complete combustion of any unburned hydrocarbons and carbon monoxide (CO) remaining in the flue gases leaving the fuel-rich reburn zone. In addition, it is also known that rapid and complete dispersion of the reburn fuel in the flue gases is beneficial. Thus, the injection of reburn fuel is frequently accompanied by the injection of a carrier fluid, such as recirculated flue gases, for the purpose of promoting mixing. To the extent that the recirculated flue gas contains oxygen, the amount of reburn fuel must be increased. Furthermore, due to the requirement of at least three combustion zones within the furnace, a primary combustion zone, a fuel-rich reburn zone downstream of the primary combustion zone, and a fuel-lean completion zone downstream of the fuel-rich reburn zone, implementation of conventional reburn technology requires a relatively tall furnace. Unfortunately, many furnaces in the United States do not have the internal volume required for retrofitting this technology.

Full scale demonstrations of conventional natural gas reburning with flue gas recirculation for mixing and overfire air for completion of combustion of unburned hydrocarbons and carbon monoxide have shown up to 65% NO reduction under the high temperature fuel-rich conditions in several cyclone, wall, and tangentially fired boilers. However, conventional natural gas reburn is expensive due to the capital and operating expenses required for recirculating flue gases and providing overfire air (also known as burn-out air). In addition, the requirement of a fuel-rich zone suggests the use of greater than 10% natural gas, making conventional gas reburn uneconomical for most coal-fired furnaces.

Because it is cheaper than natural gas, coal has also been used as a reburn fuel. However, coal reburn requires a finer grind of coal than the typical utility grind in order to improve coal devolatilization and char burnout in the upper furnace which is diminished by the lack of $O_2$ inherent in the fuel-rich zone requirement. Because coal has inherent bound nitrogen which can be oxidized to NO, the use of coal as a reburn fuel is limited to initial NO concentrations greater than 200 ppm. This effectively precludes the use of coal reburn in many furnaces equipped with low-$NO_x$ burners.

Selective non-catalytic reduction (SNCR) processes for $NO_x$ reduction are based on the injection of chemical reagents into the combustion flue gases. In these processes, $NO_x$, substantially all of which is NO, is reduced to nitrogen, $N_2$, by injection into the flue gases of a nitrogenous compound such as ammonia ($NH_3$), urea ($NH_2)_2CO$, or cyanuric acid $(HNCO)_3$. All of these compounds either directly or indirectly form $NH_i$ radicals which subsequently react with NO in the flue gases to produce $N_2$. These processes are called "selective" because the chemical reagents selectively react with NO. Thus, only small amounts of the ammonia, urea, or cyanuric acid are required.

A further process for $NO_x$ reduction in combustion flue gases involves the injection of a reburn fuel, such as natural gas, into the flue gases downstream of the primary combustion zone so as to maintain an overall fuel lean stoichiometry in the upper furnace. The chemical kinetic mechanisms of this fuel lean gas reburn process and the selective non-catalytic reduction process have many of the same selective reactions. The injection of natural gas in hot, low oxygen furnace gases results in the formation of hydrocarbon radicals ($CH_i$), and the injection of urea results in the formation of amine radicals ($NH_i$). Both of these radicals reduce NO to molecular nitrogen through a series of very similar selective reactions.

The selective non-catalytic reduction process reactions are highly efficient in reducing $NO_x$ in a narrow temperature window of about 1700° F. to about 1900° F. At higher temperatures, the process performance drops off due to oxidation of the amine additive to NO. At lower temperatures, the kinetics are too slow and result in high reagent leakage. At very high initial $NO_x$ levels, the selective non-catalytic reduction process may be effective at temperatures somewhat above 1900° F., but usually below about 2100° F.

Due to the high efficiency of the selective reactions between the $NH_i$ radicals and NO, very small quantities of the reagents are needed. The key to acceptable selective non-catalytic reduction process performance is good mixing and reagent dispersion in the flue gas, and injection of the reagents into the proper temperature zones. Typically, use of a normalized stoichiometric ratio (moles of N-atom injected/mole of NO in the flue gas) of slightly greater than 1.0 results in significant NO reduction under optimum conditions of flue gas temperature, $O_2$ concentration, and the mixing of the reducing nitrogenous reagent with the flue gases. Because of the small quantities of these reagents injected, the use of a carrier agent, such as liquid water, air, steam, or recirculated flue gas, is required to achieve the desired jet penetration and mixing. The presence of residual quantities of oxygen, which are normally present in the flue gas, is required for initiating the formation of amine-type radicals from the nitrogenous reducing agents. Because the selective reduction reactions of NO compete with the oxidation of ammonia or of other nitrogenous agents, the flue gas temperature at the point of chemical reaction should not exceed about 1900° F. Conversely, in the absence of added promoters or modifiers, the lower value of the temperature window is limited to about 1600° F. At lower temperatures, the rate of reaction of the reducing agents with NO is too slow, thereby resulting in inadequate NO reduction and in "ammonia slip," which, in turn, can result in the deposition of corrosive ammonium bisulfate and ammonium sulfate on the air heater surfaces of boilers. For coal fired boilers, "smelly fly ash" due to absorption of ammonia on the fly ash is another problem which may be caused by the ammonia slip.

The narrow process temperature window is a drawback to the implementation of the selective non-catalytic reduction process. Due to the difficulty in maintaining optimum injection temperature conditions, it may result in lower than the maximum possible NO reductions in a number of practical applications. The shifting nature of the flue gas temperature profile is especially a problem in boilers operating at varying load levels due to electric power dispatch requirements. Two approaches, used alone or in combination, are used by vendors of the selective non-catalytic reduction process to mitigate the problems caused by the shifting location of the temperature window and boilers. One approach is to design the selective non-catalytic reduction system for multiple-stage injection of a reducing agent, shifting the injection location upstream as the flue gas temperature decreases, due to lowering of the boiler load. The other approach is to co-inject free radical precursors or promoters with the ammonia or other nitrogenous reducing agents. These promoters can modulate the temperature window to lower temperatures down to about 1300° F. Thus, while the width of the optimum temperature window remains about 200° F., in practice, it can be effectively "broadened" to about 400° F.–500° F. through the use of promoters such as hydrogen, hydrocarbons, or carbon monoxide. However, the practical lower temperature limit of selective non-catalytic reduction operation with CO or hydrocarbon promoters is about 1500° F.–1600° F., below which the rate of oxidation of CO is too slow. Selective non-catalytic reduction operation above 1500° F.–1600° F. is also desirable for limiting the emission of nitrous oxides ($N_2O$) as a by-product. While not a problem with ammonia as the selective reducing agent, nitrous oxide is a greenhouse gas and, thus, its emission from some selective non-catalytic reduction process is of concern.

As previously stated, due to the small quantities of reducing nitrogenous reagents injected into the flue gases, the use of a carrier agent is required to achieve the desired jet penetration and mixing. Using natural gas as a carrier for the amine reagent widens the acceptable reaction temperature window in comparison to the selective non-catalytic reduction process, allows amine injection at higher temperatures without amine oxidation to NO, and improves the kinetic rates of the critical chemical reduction mechanisms. The natural gas creates a locally reducing environment for the amine chemistry that raises the acceptable temperature window and prevents the amine-oxidation reactions. Finally, the natural gas lowers the average oxygen concentration which generally improves the final amine reduction efficiency. Completion of the reactions at higher temperatures also decreases the chances of "ammonia slip", a by-product of both selective non-catalytic reduction and selective catalytic reduction processes.

U.S. Pat. No. 5,443,805 teaches injection of an additive such as ammonia with a small amount of hydrocarbon, preferably methane or natural gas, into flue gases at a temperature in the range of about 1750° F.–2100° F., and preferably 1800° F.–1950° F., for reducing pollutants such as $NO_x$ therein. As claimed herein, hydrocarbon is injected for the purpose of enhancing the $NO_x$ reduction efficiency of the nitrogenous $NO_x$-reducing additive in the temperature range of about 1300° F. to about 2100° F. Injection of the additive in accordance with the '805 patent is achieved by atomization of a liquid-form additive or additive solution with a small amount of the gaseous hydrocarbon. The concentration ratio (or molar ratio on a volume to volume basis (ppm/ppm)) of the hydrocarbon to the additive is between 0.2 and 0.01, and preferably about 0.1–0.03. The amount of additive is selected such that the molar ratio of additive to $NO_x$ in the flue gases is about 2.0 or less, preferably, about 1.0–1.5. Injection is carried out in a single stage such that the additive and hydrocarbon are present in the same physical region of the flue gases, a fuel-lean region, exposed simultaneously to substantially the same temperature regime. Typically, the hydrocarbon comprises up to about 0.5%–15%, and most preferably about 5%, by weight of the injected gas/additive mixture.

The method is indicated to be effective in reducing not only $NO_x$, but other species containing bound nitrogen, that is, the total bound nitrogen (TBN) which are further potential sources for the formation of $NO_x$ by oxidation. The high efficiency of TBN reduction taught by the '805 patent is attributed to atomization, mixing and distribution of proper molar ratios of additive to $NO_x$ and hydrocarbon to additive that enhance the kinetics of the $NO_x$-reducing reactions in effluent streams with rapidly changing temperature. The benefit of the approach taught by the '805 patent is that improved reduction of TBN occurs with the addition of small amounts of hydrocarbon fuel with nitrogenous additives at lower temperatures than are possible through the addition of nitrogenous additives alone. The addition of hydrocarbon fuel with nitrogenous additives also has the adverse effect of increasing the emissions (reducing the reduction) of TBN species at higher temperatures (above about 1800° F.).

U.S. Pat. No. 5,756,059 teaches a method and system for preventing the release of nitrogen oxides with combustion flue gases emitted to the atmosphere by stationary combustion systems using conventional and advanced reburning processes utilizing injection of a reducing agent into the reburning zone and the use of promoters which considerably enhance $NO_x$ control. The promoters or metal-containing compounds can be added to the reducing agent and injected into the furnace through overfire air. The introduction of overfire air above the reburn zone is required in order to ensure complete combustion of combustibles remaining in the flue gases downstream of the reburn zone.

U.S. Pat. No. 4,325,924 teaches a method of reducing $NO_x$ in fuel rich combustion effluents in which urea is introduced into the fuel rich combustion effluents at temperatures in excess of about 1900° F. in the presence of excess fuel wherein the urea is introduced either as a solid or solution in amounts sufficient to reduce the $NO_x$ concentration. The equivalence of fuel to oxygen in the flue gases is greater than 1 and the amount of urea injected into the flue gases is in the range of about 0.5–10 moles of urea per mole of nitric oxide in the flue gases. This process requires additional downstream air to prevent excessive emissions of CO and other partially burned products.

U.S. Pat. No. 5,139,755 teaches a method and system for reducing oxides of nitrogen from combustion flue gases by creating an overall fuel-rich zone above the primary combustion zone and two burnout zones disposed above the overall fuel-rich zone. In the first burnout zone, CO is reduced to below 0.5% and, in the second burnout zone, the remaining combustibles are oxidized. Nitrogenous additives may be added through either overfire air duct in the first or second burnout zones.

U.S. Pat. No. 4,861,567 teaches a method of reducing $NO_x$ and $SO_x$ emissions from combustion systems by adding cyanuric acid to a fuel-rich, oxygen-free zone. The resulting decomposed cyanuric acid and fuel-rich zone reaction products are mixed with the effluent stream of a combustion system containing $NO_x$. At this point, the oxygen level must be maintained sufficiently high to assure complete burnout of combustibles, which may require the injection of air.

SUMMARY OF THE INVENTION

It is one object of this invention to provide a method and apparatus for reducing nitrogen oxides in furnace flue gases having improved efficiency over conventional processes.

This and other objects of this invention are achieved in a furnace having a primary combustion zone for combustion of a fuel and oxidant by an in-furnace method for reducing nitrogen oxides in the combustion products generated in the primary combustion zone, the method comprising the steps of injecting at least one fluid fuel selected from the group consisting of natural gas, hydrogen, $C_xH_y$ compounds, $C_xH_yO_z$ compounds and mixtures thereof and at least one nitrogenous compound selected from the group consisting of ammonia, amines, urea, cyuranic acid, and mixtures thereof into the combustion products in the furnace downstream of the primary combustion zone, forming an overall fuel-lean $NO_x$-reduction zone, whereby the concentration ratio of a fuel equivalent of the at least one fluid fuel to a nitrogenous compound equivalent of the at least one nitrogenous compound is in a range of about 0.2 to about 90. Temperature of the overall fuel-lean $NO_x$-reduction zone is maintained in a range of about 1800° F. to about 2400° F. The concentration ratio of fuel equivalent to nitrogenous compound equivalent is defined as the moles of fuel in the $NO_x$-reducing region in equivalent $CH_4$/moles of $NO_x$-reducing agent added in equivalent $NH_i$. For example, if four moles of methane $(CH_4)$ are added with two moles of urea $(NH_2CONH_2)$, the fuel equivalent to nitrogenous compound equivalent concentration ratio is $4/(2\times2)=4/4=1.0$. This is due to the fact that each urea molecule has the equivalent of two $NH_i$ groups. Ammonia $(NH_3)$, on the other hand, has one $NH_i$ group per molecule.

Under typical flue gas conditions, $NO_x$ reductions of greater than 75% are achievable. The temperature window for operation of the method of this invention is disposed between the temperature regimes for standard reburn and selective non-catalytic reduction processes. No overfire air injection is required because the furnace is always operated under fuel-lean conditions. If necessary, the hydrocarbon fuel and the nitrogenous compound can be injected with air, vitiated air, steam or even inert carrier gases such as nitrogen and flue gas.

The method of this invention results in higher $NO_x$ reductions than either natural gas reburn or selective non-catalytic reduction, and at a lower cost. The process is well matched to the $NO_x$ reduction requirements of ozone non-attainment areas where reductions greater than 75% from uncontrolled levels may be required. Natural gas reburn or selective non-catalytic reduction alone cannot achieve such a level of $NO_x$ control. The method of this invention also offers a flexible approach which is ideal for seasonal $NO_x$ control. Raw natural gas injection with controlled mixing can be used when up to 50% $NO_x$ reduction is required. The nitrogenous compound may be co-injected with natural gas during summer when greater $NO_x$ reductions are required. The chemistry of the method of this invention occurs over a wider temperature window than the selective non-catalytic reduction process. In addition, the method requires less natural gas than standard reburn. Capital costs are also lower than standard reburn because flue gas recirculation and overfire air duct work are not required. Because the nitrogenous compound may be co-injected with the fluid fuel, the use of a carrier medium is optional. Finally, there is a reduced risk of ammonia or other reagent leakage or ammonium sulfate or related deposit formation because the fluid fuel and nitrogenous compound injection occurs at higher temperatures than selective non-catalytic reduction.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 5:
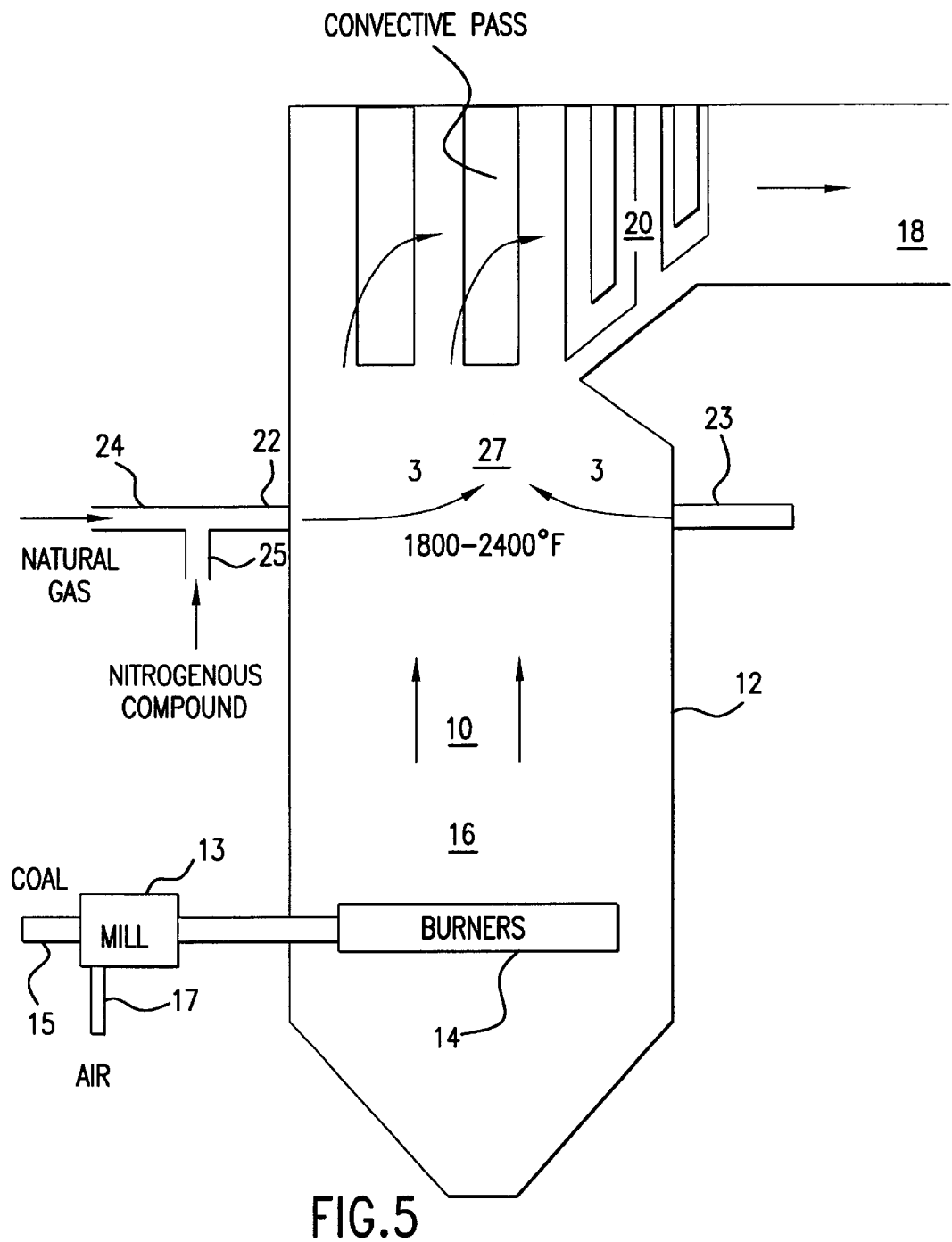
FIG. 5 is a schematic diagram of an apparatus for reducing nitrogen oxide emissions in accordance with the method of this invention.
Figure 6:
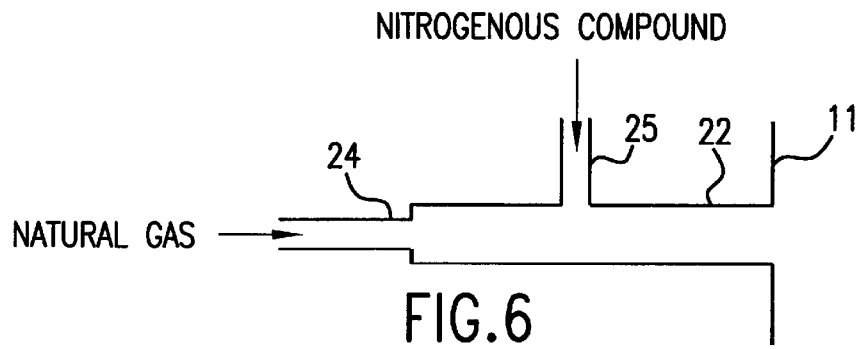
FIG. 6 is a schematic diagram of a first preferred nozzle configuration for co-injecting a fluid fuel with a nitrogenous compound in accordance with one embodiment of this invention.

As shown in FIG. 5, the apparatus for reducing nitrogen oxide emissions in combustion products 10 can be readily retrofitted to a combustion apparatus, such as an existing furnace 12. Furnace 12 for combustion of a carbonaceous material comprises primary combustion zone 16, carbonaceous material inlet means 15 for introducing carbonaceous material into the primary combustion zone, oxidant inlet means 17 for introducing an oxidant into primary combustion zone 16, and flue gas exhaust means 18 for removing flue gases from furnace 12. Although FIG. 5 shows a bottom-fired furnace, it will be apparent to those skilled in the art that the method and apparatus of this invention may be applied to all types of furnaces including tangential fired, wall fired, opposed fired, cyclones, roof-fired and stoker furnaces. Furnace 12 is particularly designed to utilize coal or any other carbonaceous fuel. The fuel enters furnace 12 through carbonaceous material inlet means comprising mills 13 and burners 14 which are shown in the lower portion of furnace 12. The fuel burns in primary combustion zone 16 in which temperatures are typically in excess of 3000° F. Combustion products 10 flow upward from primary combustion zone 16, past heat exchanger 20, through flue gas exhaust means 18 in the form of ducts, and out of the furnace. When it exits the furnace, the combustion products, or flue gases, have a temperature in the range of about 1800° F.–2500° F.

During the combustion of a carbonaceous fuel comprising fuel bound nitrogen, some of the fuel bound nitrogen reacts with oxygen to form $NO_x$ and some $NO_x$ is formed from atmospheric nitrogen and oxygen. The method of this invention reduces $NO_x$ in the flue gases based upon the reburn chemical pathway shown in FIG. 4, as a result of injection of a fluid fuel, such as natural gas, and a nitrogenous compound selected from the group consisting of ammonia, amines, urea, cyanuric acid, and mixtures thereof into furnace 12 downstream of primary combustion zone 16. The nitrogenous compound may consist of a gaseous or aqueous compound depending on economics, mixing characteristics, means of delivery, and other factors.

As shown in FIG. 5, at least one fluid fuel injector 22, 23 is connected to furnace 12, said at least one fluid fuel injector injecting at least one fluid fuel selected from the group consisting of natural gas, hydrogen, $C_xH_y$ compounds, $C_xH_yO_z$ compounds and mixtures thereof in an amount in a range of about 2.0% up to about 25% of a total heat input to furnace 12 into an overall fuel-lean $NO_x$-reduction zone 27 disposed downstream of primary combustion zone 16. In addition, at least one nitrogenous compound injector 23 is connected to furnace 12, which at least one nitrogenous compound injector injects at least one nitrogenous compound selected from the group consisting of ammonia, amines, urea, cyanuric acid, and mixtures thereof into overall fuel-lean $NO_x$-reduction zone 27. It will be apparent to those skilled in the art that the at least one fluid fuel and the at least one nitrogenous compound may be injected into furnace 12 through a common injector in accordance with the embodiments shown in FIGS. 6, 7, 8 and 9, or through separate injectors. It will also be apparent to those skilled in the art that any desired size, number and orientation of injectors may be used and that the injectors may have the ability to tilt and yaw or be otherwise adjustable.

Figure 7:
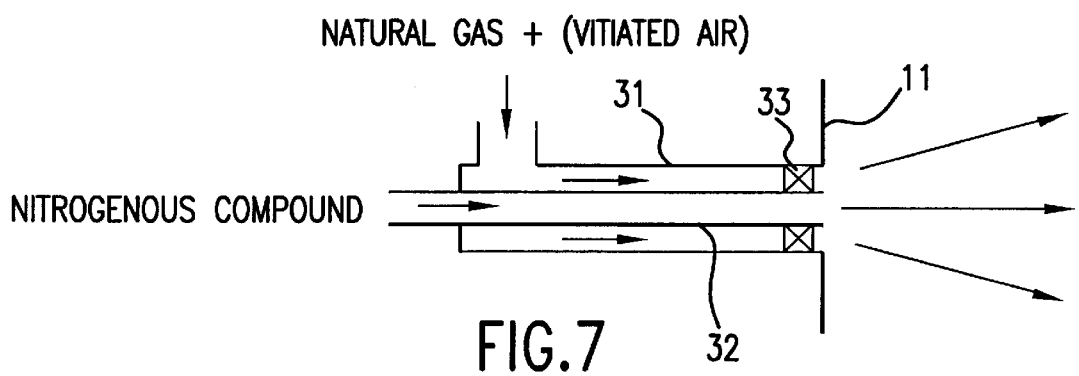
FIG. 7 is a schematic diagram of a second preferred nozzle configuration for co-injection of a fluid fuel with a nitrogenous compound in accordance with another embodiment of this invention.
Figure 8:
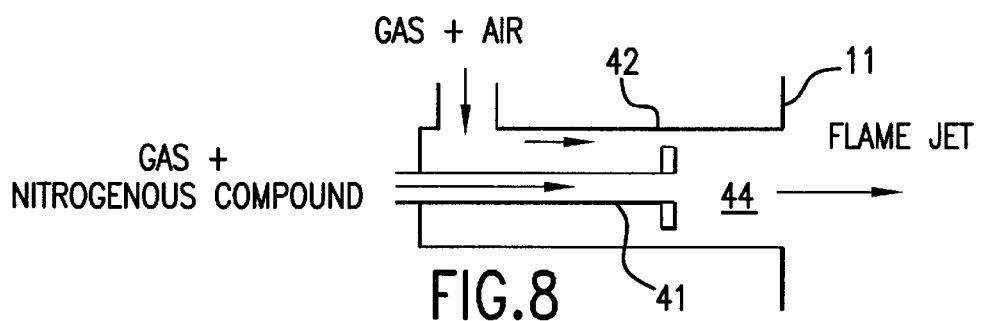
FIG. 8 is a schematic diagram of a third preferred nozzle configuration for co-injection of a fluid fuel with a nitrogenous compound in accordance with one embodiment of this invention.
Figure 9:
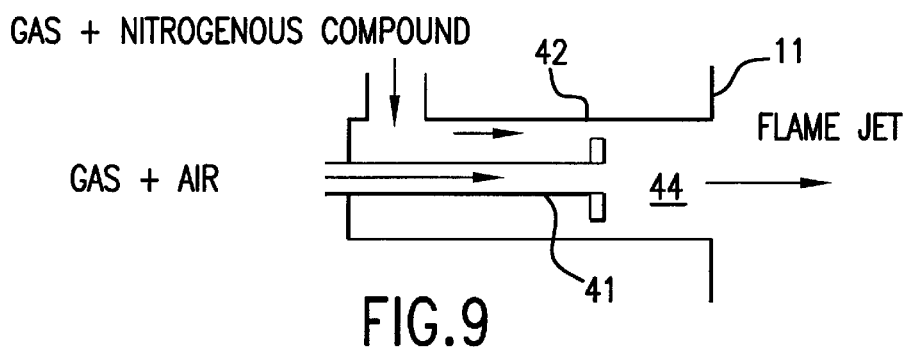
FIG. 9 is a schematic diagram of a fourth preferred nozzle configuration for co-injection of a fluid fuel with a nitrogenous compound in accordance with one embodiment of this invention.

FIGS. 6, 7, 8 and 9 each show a schematic of one of four present preferred injector designs attached to furnace wall 11. The simplest configuration is the design shown in FIG. 6 in which the gas and the nitrogenous compound supplied through pipes 24 and 25 respectively are completely premixed before injection into the furnace as a homogeneous mixture through a pipe 22. This is the least expensive injector design but it suffers from the possibility of early contact of the nitrogenous compound with the oxygen in the flue gas which can result in diminished $NO_x$ reductions. Ideally, the nitrogenous compound should be injected at the gas injection location after the oxygen levels in the flue gas have been decreased as a result of reaction with natural gas. The second configuration, shown in FIG. 7, achieves this by keeping the nitrogenous compound protected from the flue gas oxygen. The injector consists of two pipes 31 and 32. Natural gas is injected through outer pipe 31 with or without vitiated air. The nitrogenous compound is injected through pipe 32. The gas and the nitrogenous compound are completely unmixed before injection. A swirling device 33 may be placed in the outer gas stream in order to control gas ignition and mixing with the flue gas and thus limit the possibility of oxidation of the nitrogenous compound to form NO. The third design shown in FIG. 8 is possibly the best as it achieves controlled mixing and protects the nitrogenous compound from oxidation. The injector consists of two pipes 41 and 42 sized and positioned to create a flame stabilization zone 44 as shown. Inner pipe 41 supplies the majority of the natural gas and all the nitrogenous compound. An outer pipe 42 provides a combustible mixture of natural gas and air or vitiated air. The stream in pipe 42 has a small amount of the total natural gas flow but its air or vitiated air flow could be comparable or exceed the total natural gas flow. Indeed, the injector is capable of supplying from 0% to 100% of the stoichiometric air required to combust all of the injected fuel. In this configuration the outer flow through pipe 42 establishes a gas flame which acts as a shroud around the inner gas jet and prevents premature mixing of the inner gas jet with flue gas. The gas flame also increases the momentum and temperature of the inner reducing jet. The last design is shown in FIG. 9. It is similar to the design shown in FIG. 5 except that the gas and the nitrogenous compound, and gas and air streams are switched. In this design the gas and air stream is supplied via the center pipe 41. This has the practical benefit of keeping the hot gases away from the walls of pipe 42. In the nozzles of FIGS. 7, 8 and 9, steam or an inert gas such as nitrogen could be injected in place of or in addition to air or vitiated air. The optional use of steam or an inert gas provides additional control over the mixing of the natural gas and the nitrogenous compound with the flue gas.

Figure 1:
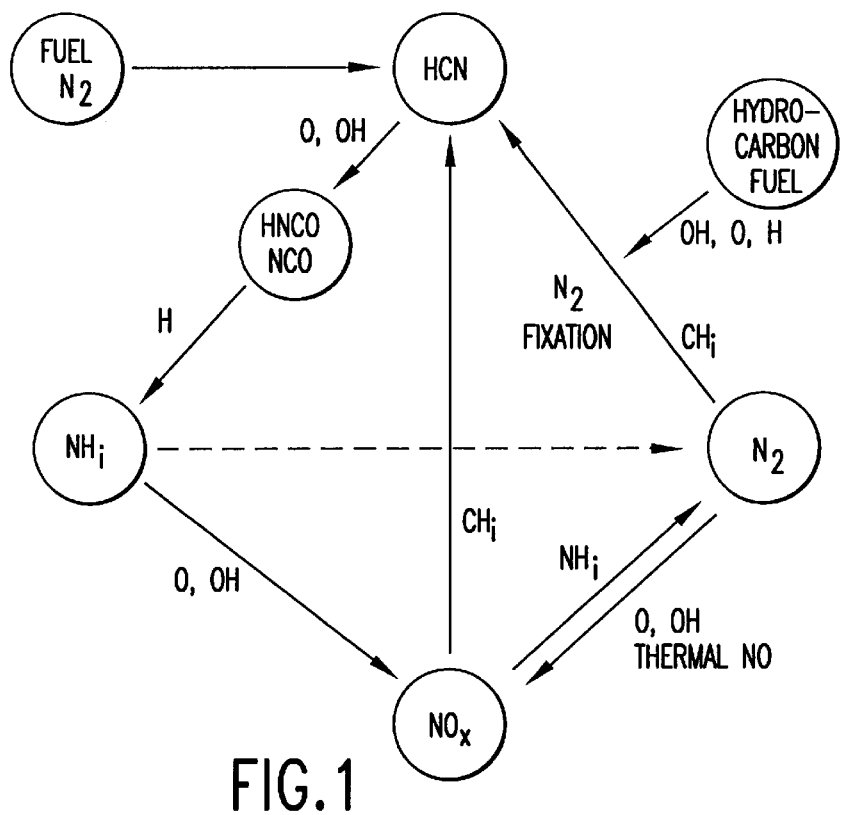
FIG. 1 is a schematic diagram showing possible $NO_x$ reaction pathways within a combustion process under various conditions.
Figure 3:
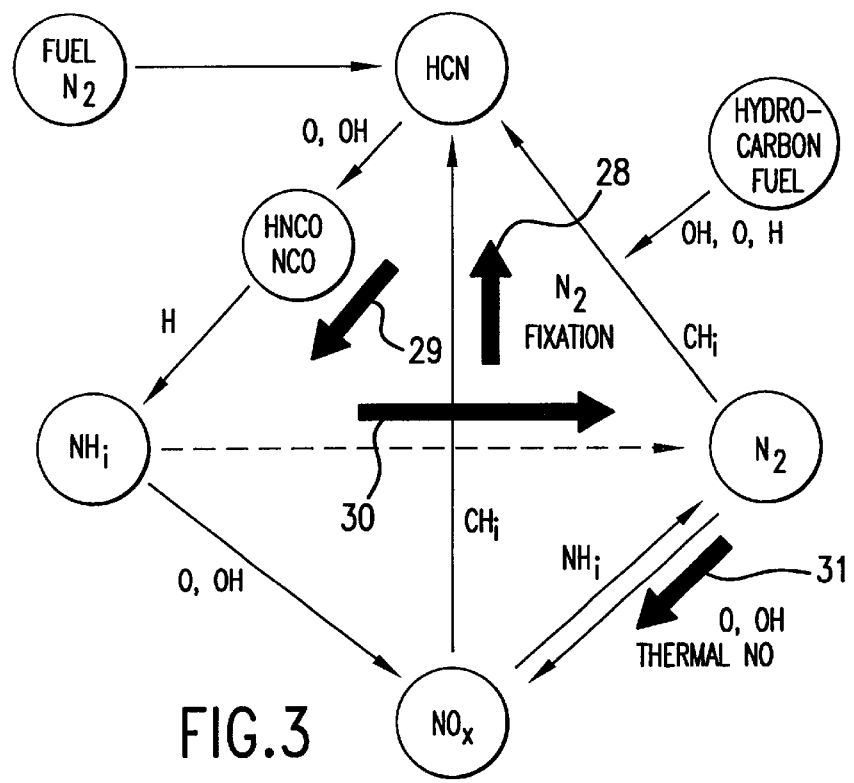
FIG. 3 is a schematic diagram showing the preferred $NO_x$ reaction pathways for reburning.

FIG. 1 is a diagram showing the various $NO_x$ reaction pathways by which $NO_x$ is formed or reduced in a furnace depending upon the conditions within the furnace. For example, as shown in FIG. 1, nitrogen in the fuel (Fuel $N_2$) may react to form HCN which, in an oxidizing environment, is converted to HNCO, NCO, $NH_i$ and ultimately $NO_x$. In a conventional reburn process, that is a process in which a hydrocarbon fuel such as natural gas is injected into the flue gases 10 downstream of primary combustion zone 16, the dominant reactions are shown in FIG. 3. $CH_i$ radicals are formed from fuel injection to form a fuel-rich zone which converts $NO_x$ in the flue gases to HCN (arrow 28). And because the introduction of reburn fuel results in the formation of a fuel-rich (reducing) zone, there is insufficient oxygen present in the flue gases to convert the HCN to $NO_x$. Instead, the HCN is converted to $NH_i$ radicals which, in turn, are converted to $N_2$ (arrows 29 and 30). With the addition of burn-out air (overfire air), a small amount of thermal $NO_x$ is formed (arrow 31).

Figure 2:
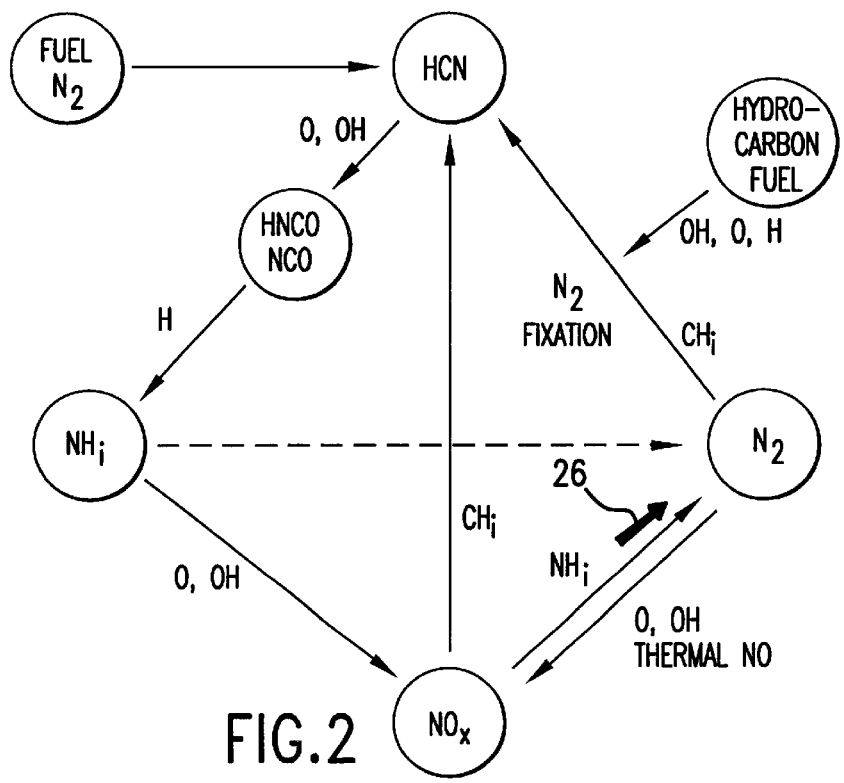
FIG. 2 is a schematic diagram showing the preferred $NO_x$ reaction pathways for a selective non-catalytic reduction method.

In conventional selective non-catalytic reduction processes, a nitrogenous compound is injected into the flue gases 10. The increase in $NH_i$ radicals directly or indirectly formed from the nitrogenous compounds results in a shift in the $NO_x$ reactions path ways as indicated by arrow 26 in FIG. 2. In this case, $NO_x$ which is present in the flue gases is converted due to the presence of $NH_i$ radicals in the flue gases to $N_2$. For this reaction to be favored, the temperature of the flue gases must be below the level at which significant amounts of thermal $NO_x$ are formed and above a temperature where the reaction kinetics are too slow and the flue gases must have an oxidizing composition, that is free oxygen is available for reaction with the $NH_i$ to form $N_2$ and $H_2O$.

Figure 4:
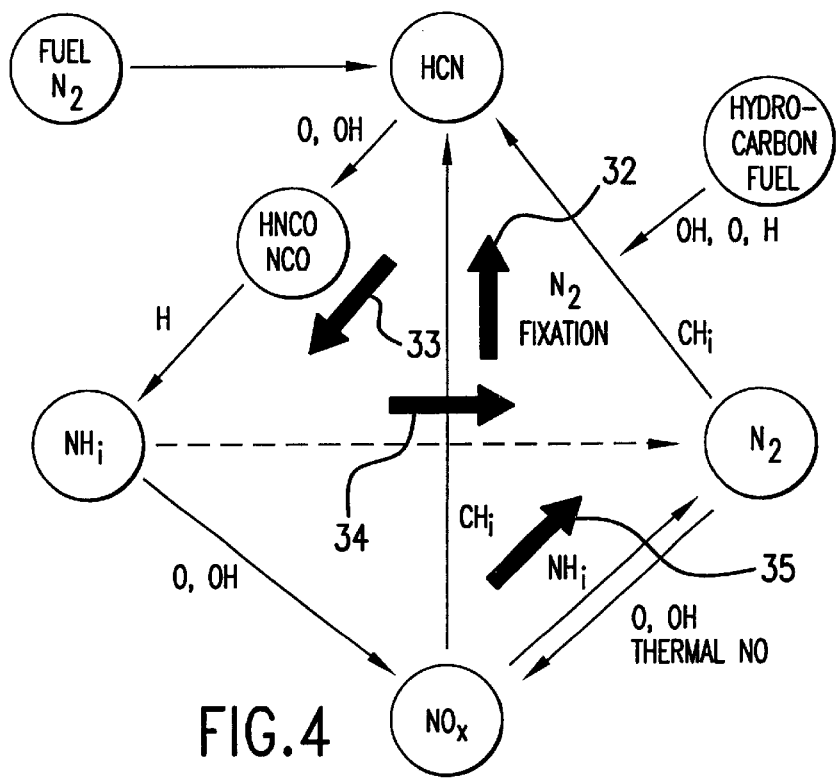
FIG. 4 is a schematic diagram showing the $NO_x$ reaction pathway believed to result from the method of this invention.

FIG. 4 shows at least one possible reaction pathway by which $NO_x$ emissions are reduced employing the method of this invention. This possible reaction pathway is presented for exemplary purposes only and is not intended in any way to limit the scope of this invention or to suggest that only one reaction pathway is possible in accordance with this invention. In accordance with the method of this invention, in a furnace as shown in FIG. 5 having a primary combustion zone 16 for combustion of a fuel and oxidant, at least one fluid fuel is introduced through fluid fuel injector 24 together with at least one nitrogenous compound into furnace 12 downstream of the primary combustion zone 16 in an amount sufficient to form a $NO_x$-reduction zone which, on average, is fuel lean, that is oxidizing. As shown in FIG. 4, the conventional $NO_x$ reaction pathways are shifted in favor of the pathway designated by arrows 32, 33, 34 and 35. It should be noted that in this suggested reaction pathway, the thermal $NO_x$ reformation pathway (arrow 31) is avoided and the selective $NO_x$-reduction pathway (arrow 35) exists.

As previously stated, in conventional reburn processes, stoichiometry in the reburn zone is fuel-rich and flue gas temperatures at the injection point of the reburn fuel are typically above 2600° F. In selective non-catalytic reduction processes, a nitrogenous compound is injected into the flue gases downstream of the primary combustion zone, which flue gases must be at a temperature in the narrow range of about 1700° F. to about 1900° F. in order to maintain a relatively high efficiency with respect to the reduction of $NO_x$. For reasons previously stated, operation within a narrow temperature range as required by conventional selective non-catalytic reduction processes is undesirable. In contrast thereto, in accordance with a particularly preferred embodiment of this invention, the temperature of the overall fuel-lean $NO_x$-reduction zone resulting from the injection of fluid fuel and oxidant is most preferably in the relatively broad range of about 1800° F. to about 2700° F., which range is considered to be most beneficial for preventing the formation of thermal $NO_x$ while still maintaining overall process efficiency. Less preferably, the temperature range may be about 1700° F. to about 3000° F. As discussed hereinabove, U.S. Pat. No. 5,443,805 teaches the injection of a nitrogenous compound (ammonia) together with a small amount of hydrocarbon (methane or natural gas) into the flue gases of a furnace for the purpose of $NO_x$ reduction. Regarding the temperatures at which this process can be carried out, FIG. 6 of the '805 patent teaches that $NO_x$ concentrations in the flue gases increase at temperatures above about 1600° F., particularly as the amount of fuel in relation to the amount of nitrogenous compounds introduced into the flue gases is increased. Thus, it is indeed surprising that $NO_x$ reductions can be achieved particularly at the higher temperatures in the range of temperatures for carrying out the method of this invention.

In accordance with one preferred embodiment of this invention, suitable fluid fuels for injection into the flue gases are selected from the group consisting of natural gas, hydrogen, $C_xH_y$ compounds, $C_xH_yO_z$ compounds and mixtures thereof, where x is a number in the range of 1 to 26, y is a number in the range of 4 to 54, and z is a number in the range of 1 to 26. In accordance with a particularly preferred embodiment of this invention, said fluid fuel is natural gas.

In accordance with one preferred embodiment of this invention, the at least one nitrogenous compound injected into the flue gases is selected from the group consisting of ammonia, amines, urea, cyanuric acid, and mixtures thereof. In accordance with a particularly preferred embodiment, the nitrogenous compound is urea.

The injection of a nitrogenous compound and a hydrocarbon fuel into flue gases for the purpose of $NO_x$ reduction is taught by the '805 patent. As claimed herein, hydrocarbon is injected for the purpose of enhancing the $NO_x$-reduction efficiency of a nitrogenous $NO_x$-reducing additive in the temperature range of about 1300° F. to about 2100° F. The concentration ratio of hydrocarbon fuel to nitrogenous additive on a volume-to-volume basis is indicated to be in the range of about 0.2 to 0.01 and the amount of nitrogenous additive is selected such that the molar ratio of nitrogenous additive to $NO_x$ in the flue gases is 2.0 or less. In addition to $NO_x$ reduction, the method of the '805 patent is effective in reducing other species containing bound nitrogen such as HCN, HNCO, NCO, $NH_3$, $NH_2$, NH, N, NO, $N_2O$, $N_2H_2$, $N_2H$, nitrogenous combustion products, and unburned nitrogenous fuel contaminants. The high efficiency of total bound nitrogen reduction is indicated to be due to proper molar ratios of nitrogenous additives to $NO_x$ and hydrocarbon fuel to nitrogenous additive. Thus, it is unexpected that $NO_x$ reduction is achievable in accordance with the method of the invention.

In particular, in accordance with one particularly preferred embodiment of this invention, the molar ratio of nitrogenous compound to $NO_x$ concentration is in a range of about 0.1 to about 5.0, more preferable 0.2 to 2.0. In accordance with one preferred embodiment of this invention, the concentration ratio of fluid fuel equivalent to nitrogenous compound equivalent is in the range of about 0.2 to 30, more preferably 5 to 15, substantially above the range taught by the '805 patent.

It will be apparent to those skilled in the art that the fluid fuel and nitrogenous compound may be injected together, that is through the same input device, or through separate input devices into the flue gases. The essential element of the method of this invention is that both the fluid fuel and the nitrogenous compound are injected into the same location in the flue gases. In accordance with one preferred embodiment of this invention, the fluid fuel is injected into an upper region of the furnace at a distance from the primary combustion zone. In accordance with another preferred embodiment of this invention, the fluid fuel is injected into a convective zone of the furnace.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In a furnace having a primary combustion zone for combustion of a fuel and oxidant, an in-furnace method for reducing nitrogen oxides in combustion products generated in said primary combustion zone comprising the steps of:

injecting at least one fluid fuel selected from the group consisting of natural gas, hydrogen, $C_xH_y$ compounds, $C_xH_yO_z$ compounds and mixtures thereof in an amount in a range of about 2.0% to about 25% of a total heat input to said furnace and at least one nitrogenous compound selected from the group consisting of ammonia, amines, urea, cyanuric acid and mixtures thereof of said primary combustion zone, forming an overall fuel-lean $NO_x$-reduction zone having a temperature of between above 2100° F. and about 3000° F.

2. A method in accordance with claim 1, wherein said nitrogenous compound is urea.

3. A method in accordance with claim 2, wherein a molar ratio of said nitrogenous compound to a $NO_x$ concentration in said combustion products is in a range of about 0.1 to about 5.0.

4. A method in accordance with claim 3, wherein a concentration ratio of fluid fuel equivalent to nitrogenous compound equivalent is in a range of about 5 to about 15.

5. A method in accordance with claim 1, wherein said fluid fuel is injected into an upper region of said furnace.

6. A method in accordance with claim 1, wherein said fluid fuel is injected into a convective zone of said furnace.

7. A method in accordance with claim 1, wherein said fluid fuel is natural gas.

8. A method in accordance with claim 1, wherein a molar ratio of said nitrogenous compound to a $NO_x$ concentration in said combustion products leaving said primary combustion zone is in a range of about 0.1 to about 5.0.

9. A method in accordance with claim 1, wherein a concentration ratio of fluid fuel equivalent to nitrogenous compound equivalent is in a range of about 0.2 to about 30.

10. A method in accordance with claim 8, wherein a concentration ratio of fluid fuel equivalent to nitrogenous compound equivalent is in a range of about 0.2 to about 30.

11. A method in accordance with claim 9, wherein a concentration ratio of fluid fuel equivalent to nitrogenous compound equivalent is in a range of about 5 to about 15.

12. In a furnace having a primary combustion zone for combustion of a fuel and oxidant, an in-furnace method for reducing nitrogen oxides in combustion products generated in said primary combustion zone comprising the steps of:

injecting at least one fluid fuel selected from the group consisting of natural gas, hydrogen, $C_xH_y$ compounds, $C_xH_yO_z$ compounds and mixtures thereof in an amount in a range of about 2.0% to about 25% of a total heat input to said furnace and at least one nitrogenous compound selected from the group consisting of ammonia, amines, urea, cyanuric acid and mixtures thereof downstream of said primary combustion zone, forming an overall fuel-lean $NO_x$-reduction zone, wherein a molar ratio of said nitrogenous compound to a $NO_x$ concentration in said combustion products is in a range of about 0.1 to about 5.0.

13. A method in accordance with claim 12, wherein said overall fuel-lean $NO_x$-reduction zone has a temperature of between above 2100° F. and about 3000° F.

14. A method in accordance with claim 12, wherein said nitrogenous compound is urea.

15. A method in accordance with claim 14, wherein a concentration ratio of fluid fuel equivalent to nitrogenous compound equivalent is in a range of about 5 to about 15.

16. A method in accordance with claim 12, wherein said fluid fuel is injected into an upper region of said furnace.

17. A method in accordance with claim 12, wherein said fluid fuel is injected into a convective zone of said furnace.

18. A method in accordance with claim 12, wherein said fluid fuel is natural gas.

19. A method in accordance with claim 12, wherein a concentration ratio of fluid fuel equivalent to nitrogenous compound equivalent is in a range of about 0.2 to about 30.

20. A method in accordance with claim 12, wherein a concentration ratio of fluid fuel equivalent to nitrogenous compound equivalent is in a range of about 5 to about 15.

21. In a furnace having a primary combustion zone for combustion of a fuel and oxidant, an in-furnace method for reducing nitrogen oxides in combustion products generated in said primary combustion zone comprising the steps of:

injecting at least one fluid fuel selected from the group consisting of natural gas, hydrogen, $C_xH_y$ compounds, $C_xH_yO_z$ compounds and mixtures thereof in an amount in a range of about 2.0% to about 25% of a total heat input to said furnace and at least one nitrogenous compound selected from the group consisting of ammonia, amines, urea, cyanuric acid and mixtures thereof downstream of said primary combustion zone, forming an overall fuel-lean $NO_x$-reduction zone, wherein a concentration ratio of fluid fuel equivalent to nitrogenous compound equivalent is in a range of about 0.2 to about 30.

22. A method in accordance with claim 21, wherein said overall fuel-lean $NO_x$-reduction zone has a temperature of between above 2100° F. and about 3000° F.

23. A method in accordance with claim 21, wherein said nitrogenous compound is urea.

24. A method in accordance with claim 21, wherein a molar ratio of said nitrogenous compound to an $NO_x$ concentration in said combustion products is in a range of about 0.1 to about 5.0.

25. A method in accordance with claim 21, wherein a concentration ratio of fluid fuel equivalent to nitrogenous compound equivalent is in a range of about 5 to about 15.

26. A method in accordance with claim 21, wherein said fluid fuel is injected into an upper region of said furnace.

27. A method in accordance with claim 21, wherein said fluid fuel is injected into a convective zone of said furnace.

28. A method in accordance with claim 21, wherein said fluid fuel is natural gas.

29. A method in accordance with claim 21, wherein a molar ratio of said nitrogenous compound to a $NO_x$ concentration in said combustion products leaving said primary combustion zone is in a range of about 0.1 to about 5.0.

30. A method in accordance with claim 29, wherein a concentration ratio of fluid fuel equivalent to nitrogenous compound equivalent is in a range of about 5 to about 15.

31. In a furnace having a primary combustion zone for combustion of a fuel and oxidant, an in-furnace method for reducing nitrogen oxides in combustion products generated in said primary combustion zone comprising the steps of:

injecting at least one fluid fuel selected from the group consisting of natural gas, hydrogen, $C_xH_y$ compounds, $C_xH_yO_z$ compounds and mixtures thereof in an amount in a range of about 2.0% to about 25% of a total heat input to said furnace and at least one nitrogenous compound selected from the group consisting of ammonia, amines, urea, cyanuric acid and mixtures thereof downstream of said primary combustion zone, forming an overall fuel-lean $NO_x$-reduction zone having a temperature of between above 2100° F. and about 3000° F., wherein a concentration ratio of fluid fuel equivalent to nitrogenous compound equivalent is in a range of about 0.2 to about 30 and a molar ratio of said nitrogenous compound to a $NO_x$ concentration in said combustion products is in a range of about 0.1 to about 5.0.

32. A method in accordance with claim 31, wherein said nitrogenous compound is urea.

33. A method in accordance with claim 32, wherein a concentration ratio of fluid fuel equivalent to nitrogenous compound equivalent is in a range of about 5 to about 15.

34. A method in accordance with claim 32, wherein said fluid fuel is injected into an upper region of said furnace.

35. A method in accordance with claim 32, wherein said fluid fuel is injected into a convective zone of said furnace.

36. A method in accordance with claim 32, wherein said fluid fuel is natural gas.

37. A method in accordance with claim 36, wherein a concentration ratio of fluid fuel equivalent to nitrogenous compound equivalent is in a range of about 5 to about 15.

* * * * *